United States Patent
Singh

[19]

[11] Patent Number: 6,157,379
[45] Date of Patent: Dec. 5, 2000

[54] APPARATUS AND METHOD OF FORMATTING A LIST FOR DISPLAY ON A TOUCHSCREEN

[75] Inventor: Mona Singh, Cary, N.C.

[73] Assignee: Ericsson Inc., Research Triangle Park, N.C.

[21] Appl. No.: 09/083,012

[22] Filed: May 21, 1998

[51] Int. Cl.$^7$ ........................................... G06F 3/033
[52] U.S. Cl. ............................... 345/333; 345/173
[58] Field of Search ...................... 345/326, 333, 345/339, 340, 342, 350, 352, 353, 354, 146, 157, 169, 173

[56] References Cited

U.S. PATENT DOCUMENTS

| | | | |
|---|---|---|---|
| 5,119,079 | 6/1992 | Hube et al. | 345/146 |
| 5,347,295 | 9/1994 | Agulnick et al. | 345/156 |
| 5,627,567 | 5/1997 | Davidson | 345/173 |
| 5,801,941 | 9/1998 | Bertram | 700/83 |
| 5,805,157 | 9/1998 | Bertram et al. | 345/339 |

OTHER PUBLICATIONS

"Algorithm For Decreasing The Error Rate Of Data Entered On A Touchsensitive Terminal," IBM Technical Disclosure Bulletin, vol. 33, No. 10A, Mar. 1991, pp. 223–227.

*Primary Examiner*—Crescelle N. dela Torre
*Attorney, Agent, or Firm*—Davidson & Gribbell, LLP

[57] ABSTRACT

An apparatus and method of formatting for display within a designated list window of a touchscreen, the list including a plurality of list members with a touchable element and text associated therewith. The method includes the following steps: setting a minimum required distance between the touchable elements of adjacent list members; setting an area for each touchable element of the list members, wherein the area has a vertical component and a horizontal component; positioning a first list member within the list window; and, spacing each subsequent list member vertically and horizontally from an immediately preceding list member such that the minimum required distance between adjacent touchable elements is maintained. The vertical spacing between adjacent touchable elements may be set, with the horizontal spacing between touchable elements being determined from the minimum required distance between adjacent touchable elements, the interline spacing, and the vertical component of the touchable elements. Alternatively, the horizontal spacing between adjacent touchable elements can be set, with the vertical spacing between adjacent touchable elements being determined from the minimum required distance between adjacent touchable elements and the horizontal spacing. The touchable elements may be spaced in a repeating pattern, where the number of horizontal levels in the pattern can be selected by the user, determined as a function of the minimum required distance between adjacent touchable elements and the vertical spacing between adjacent touchable elements, or determined as a function of the physical size of the list window, the field width required for the associated text, and the indentation distance. The touchable element spacing within the list window is maximized by evaluating the number of lines of text to be displayed and the interline spacing, where adjacent touchable elements are offset horizontally when all list members cannot be displayed and spaced vertically by at least the minimum required distance between adjacent touchable elements.

50 Claims, 12 Drawing Sheets

APPARATUS AND METHOD OF FORMATTING A LIST FOR DISPLAY ON A TOUCHSCREEN

BACKGROUND OF THE INVENTION

1. Field of the Invention

The present invention relates generally to a computer-controlled touchscreen display and, more particularly, to an apparatus and method of formatting a list for display on a touchscreen which more efficiently utilizes the area of a list window within the touchscreen without increasing selection ambiguity.

2. Description of Related Art

Various types of computer-based devices have been developed for communications, information processing and other purposes. Among these devices are personal computers, personal digital assistants, and a relatively new class of devices known as portable intelligent communications devices. Unlike the first two devices, the portable intelligent communications device is designed extensively to be a communications device, rather than just a mobile computer, and as such it includes a computer integrated with communications hardware and software to provide telephony, messaging and information services. To enable at least some of these features, the portable intelligent communications device is able to be connected to the Internet by either a wired link or a wireless link.

It will also be understood that certain software applications are provided within the portable intelligent communications device which facilitate the aforementioned features, as well as other desirable features such as a Personal Information Manager (PIM), games and the like. An exemplary portable intelligent communications device is shown and disclosed in a patent application entitled "Switching Of Analog Signals In Mobile Computing Devices" and having Ser. No. 08/796,119, which is owned by the assignee of the present invention and is hereby incorporated by reference.

Portable intelligent communications devices, like other computer-controlled devices, include a screen or display panel to enable a user to interact with the computer through a graphical user interface. This interaction is oftentimes accomplished by way of a mouse or other pointing device. To input or select information from the screen, the user manipulates the mouse to direct a cursor to the appropriate screen area. Once at the appropriate area, the user selects the item or information by using a mouse button or entering a command or text through a keyboard.

In mouse-based systems, text at a common logic level, such as in a display list, is typically aligned vertically along the left side of the screen display. FIG. 1 depicts an exemplary screen display 10 containing a representative display list 12 from a phonebook software application, such as which may be used to save and group business card information on a portable intelligent communications device or similar computer. It will be noted that screen display 10 includes a title bar 14 (i.e., "PhoneDialer") located in a top window therein, as well as a main control panel 16 including a plurality of tabbed areas which, in the representative application, are designated as "Phone," "Setup" and "Help." A second level of menu choices or control buttons 18 appear after selection of one of the tabbed areas in main control panel 16. In the representative screen display 10, control buttons 18 available under the Phone tab are denoted as "Call," "Transfer," "End," "Hold," "Volume" and "Mute," respectively. A third set of control buttons 20 appear after selection of one of second level control buttons 18. It will be noted that control buttons 20 available under the "Call" button in the representative application are denoted as "Previous," "List," "BC" and "Next". A bottom rectangular area 22 of screen display 10 includes a set of control buttons 24 denoted as "KeyPad," "Speed Dial," "Phone Book" and "Voice Mail," as well as a message window 26 for displaying status information. A fourth set of command options is provided along the right side of screen display 10, as designated generally by numeral 28.

Screen display 10 further includes a work area 30 (otherwise known herein as a list window) having a width W and a height H within which representative list 12 is displayed. Since the size of list window 30 will typically be too small to display all list members 13 of list 12 at one time, a vertical scroll bar 32 is provided therein for stepping between such list members 13. It will be seen in screen display 10 that each list member 13 is a name aligned under the subgroup heading "Personal" for the overall group heading of "Phonebooks." Accordingly, selection of any one of list members 13 causes the aforementioned portable intelligent communications device to retrieve a phone number for the name corresponding thereto, which preferably is automatically dialed by the telephony feature of the device. It will be noted that display list 12 in FIG. 1 is depicted in a typical mouse-based format, where list members 13 (in this case names) are aligned along left side 34 of list window 30. In this format, adjacent list members are separated by a designated interline spacing, identified by reference numeral 36, that is sufficient to enable any one of list members 13 to be selected unambiguously with a cursor.

While the display list format depicted in FIG. 1 is acceptable for mouse-based systems which utilize a cursor, it becomes problematic for other types of systems, such as touch-based systems, in which a user interacts with the computer by touching designated areas on the screen. In a touch-based system, it will be understood that representing display lists in the manner depicted in FIG. 1 leads to selection errors, as caused by the alignment of such list members and the close, interline spacing therebetween. Further, such display list format does not efficiently utilize the limited real estate of list window 30.

FIG. 2 illustrates another screen display 11, similar to that of FIG. 1, in which the presentation of a display list 15 has been adapted for a touchscreen. The panels and control buttons in FIG. 2 are the same as those described with respect to FIG. 1 and, therefore, are identified by the same reference numerals. As shown in FIG. 2, individual list members 17 of display list IS remain vertically aligned adjacent left side 34 of list window 30. In order to accommodate finger-based selection, however, icons or touchable elements 38 are provided as a touch target for each list member 17 and placed immediately to the left of the text associated with such list member. Further, interline spacing 37 between adjacent list members 17 is necessarily increased to reduce the selection ambiguity that would otherwise be created by the size difference between a finger and a cursor.

While increasing interline spacing 37 between list members 17 reduces the problem of selection ambiguity, it also reduces the number of list members 17 that can be displayed in list window 30. This is undesirable given the already limited size of the touchscreen on many computer-controlled devices, such as the aforementioned portable intelligent communications device. Thus, because the time required to find a desired list member 17 is increased and the user-friendliness of the device is therefore decreased, formatting display lists as shown in FIG. 2 is not considered an efficient solution.

Accordingly, it is a primary object of the present invention to provide an apparatus and method of formatting a list for display on a touchscreen which maximizes the number of list members displayed for a given area of the touchscreen without creating selection ambiguity.

It is another object of the present invention to provide an apparatus and method of formatting a list for display on a touchscreen in which the distance between list members is increased over that of a mouse-based system without increasing the vertical area required to display the list.

It is still another object of the present invention to provide an apparatus and method of formatting a list for display on a touchscreen in which the spacing between the touchable elements of adjacent list members have both a vertical component and a horizontal component.

Yet another object of the present invention is to provide an apparatus and method in a portable intelligent communications device of formatting a display list, in which the spacing between list member touchable elements is optimized based upon the dimensions of the list window, the total number of list members in the list, the interline spacing between adjacent list members, and the distance required between adjacent touchable elements for unambiguous selection.

These objects and other features of the present invention will become more readily apparent upon reference to the following description when taken in conjunction with the following drawings.

SUMMARY OF THE INVENTION

In accordance with a first aspect of the present invention, a method of formatting a list for display within a designated list window of a touchscreen is disclosed. The list includes a plurality of list members with a touchable element and text associated therewith. The method includes the following steps: setting a minimum required distance between touchable elements of adjacent list members; setting an area for each touchable element of the list members, wherein the area has a vertical component and a horizontal component; setting a required interline spacing between touchable elements of adjacent list members; calculating a line-space for each list member as a function of the vertical component of the touchable element area and the interline spacing; positioning a first list member within a designated line-space of the list window; and, spacing each subsequent list member vertically and horizontally a specified amount from an immediately preceding list member in the list so that at least the minimum required distance between adjacent touchable elements is maintained.

In accordance with a second aspect of the present invention, an alternative method of formatting a list for display within a designated list window of a touchscreen is disclosed where the list also includes a plurality of list members with a touchable element and text associated therewith. The method includes the following steps: setting a minimum required distance between touchable elements of adjacent list members; setting an area for each touchable element of the list members, wherein the area has a vertical component and a horizontal component; setting an indentation distance between touchable elements of adjacent list members; positioning a first list member at a designated location within the list window; horizontally spacing each subsequent list member from an immediately preceding list member in the list by at least the indentation distance; and, vertically spacing each subsequent list member from an immediately preceding list member by an amount calculated as a function of the indentation distance and the minimum required distance between adjacent touchable elements.

In accordance with a third aspect of the present invention, a method of displaying a list for finger-based selection in a computer system having a memory circuit, a processing circuit and a touchscreen is disclosed. The method includes the steps of formatting and displaying, under the control of the processing circuit, a plurality of touchable elements and associated text within a list window on the touchscreen. Each of the touchable elements is spaced from immediately adjacent touchable elements a specified distance to permit selection of any one of the touchable elements without any other of the adjacent touchable elements being simultaneously selected, the specified distance having a horizontal component and a vertical component.

In accordance with a fourth aspect of the present invention, a portable intelligent communications device is disclosed as including circuitry for performing telephony operations, a memory circuit for storing at least one display list, a processing circuit, and a touchscreen coupled to the processing circuit for displaying lists. The processing circuit associates a touchable element with each list member of the display list and formats the touchable elements within a list window of the touchscreen so that immediately adjacent touchable elements are spaced vertically and horizontally a minimum specified distance to permit finger-based selection of any one of the touchable elements without simultaneous selection of any adjacent touchable elements. The vertical spacing between adjacent touchable elements may be set, with the horizontal spacing being determined by the processing circuit as a function of the minimum specified distance, the vertical spacing, and the height of the touchable elements. Alternatively, the horizontal spacing between adjacent touchable elements may be set, with the vertical spacing being determined by the processing circuit as a function of the minimum required distance and the horizontal spacing.

In accordance with a fifth aspect of the present invention, a method of formatting a list of touchable elements and associated text on a touchscreen of a portable intelligent communications device is disclosed, where the number of touchable elements and associated text displayed within a list window on the touchscreen is maximized without creating selection ambiguity. The method includes the following steps: setting a minimum required distance between touchable elements of adjacent list members; setting an area for each touchable element of the list members, wherein the area has a vertical component and a horizontal component; setting a required interline spacing between touchable elements of adjacent list members; calculating a line-space for each list member as a function of the vertical component of the touchable element area and the interline spacing; determining a horizontal offset spacing between adjacent touchable elements; determining a maximum number of offset levels for a repeating pattern of the touchable elements; positioning a first touchable element and associated text within a first line-space on the list window; spacing each subsequent touchable element horizontally and vertically from an immediately preceding touchable element by the offset spacing in an offset pattern until the maximum offset level is reached; and, repeating the offset pattern until all the touchable elements and associated text in the list are displayed.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 3:
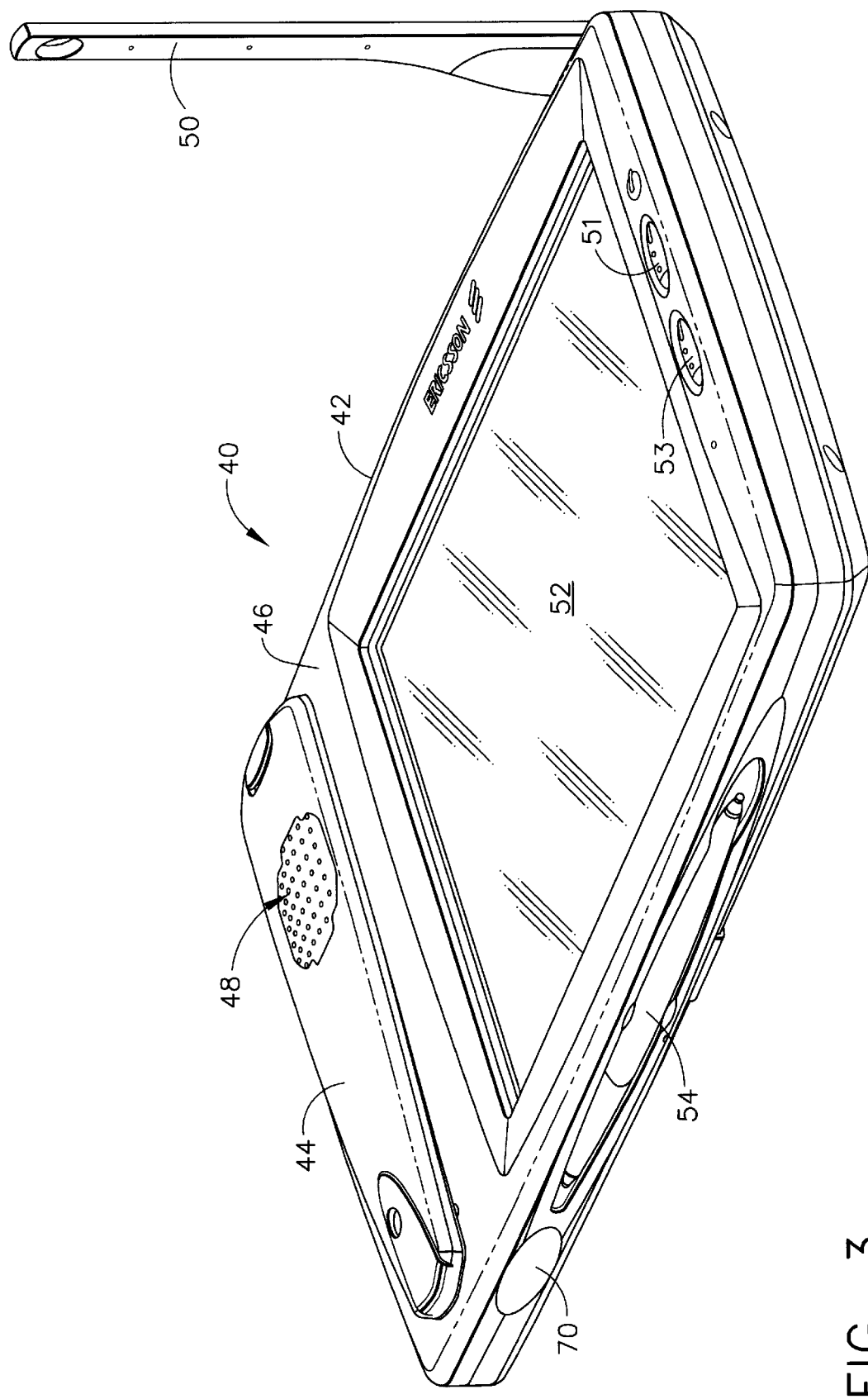
FIG. 3 is a perspective view of a portable intelligent communications device having a touchscreen in accordance with the present invention.

Referring now to the drawings in detail, wherein identical numerals indicate the same elements throughout the figures, FIG. 3 depicts a portable intelligent communications device identified generally by the numeral 40. It will be understood that portable intelligent communications device 40 is principally a communications device, and includes circuitry and components which allow it to function in such capacity through cellular, landline, infrared data association (IrDA), phone cards, and other modes. Portable intelligent communications device 40 also includes circuitry which enables it to function in the capacity of a computer and a plurality of software applications may be utilized therewith. Because of this combination, portable intelligent communications device 40 is uniquely suited to interface software applications with the communications hardware and software, particularly where connection to an Internet address is desired. In this regard, it will be understood that portable intelligent communications device 40 generally operates in accordance with a device shown and described in a patent application entitled "Switching Of Analog Signals In Mobile Computing Devices" and having Ser. No. 08/796,119, which is also owned by the assignee of the present invention and is hereby incorporated by reference.

As seen in FIG. 3, portable intelligent communications device 40 includes a casing 42 for housing the communications and other circuitry as will be discussed in greater detail hereinafter. A handset 44 is positioned within a top portion 46 of casing 42 and preferably includes a built-in speaker 48 for use when handset 44 is maintained therein. A pivotable antenna 50 (shown in FIG. 3 in the open or use position) is provided to enable a communications function, as when portable intelligent communications device 40 is in a cellular mode of operation. It will be understood that various ports, jacks, and interfaces will be provided to further enable communications functions by portable intelligent communications device 40. Control buttons 51 and 53 are also shown as being located on top portion 46 of casing 42.

Portable intelligent communications device 40 further includes a display screen 52, which preferably is a touchscreen. It will be appreciated that a stylus 54 may optionally be utilized to indicate a particular area more specifically than can be accomplished with the user's finger, although most designated areas are sized for touch interaction by a typically sized finger. Since portable intelligent communications device 40 preferably is no larger than a standard business desk telephone, display screen 52 is sized to be approximately eight (8) inches measured diagonally across. This puts screen display 52 in a distinct size class, as it is smaller than normal monitor sizes for personal and portable computers and larger than screen displays for personal digital assistants (PDAs), calculators, and other similar personal electronic devices.

Figure 4:
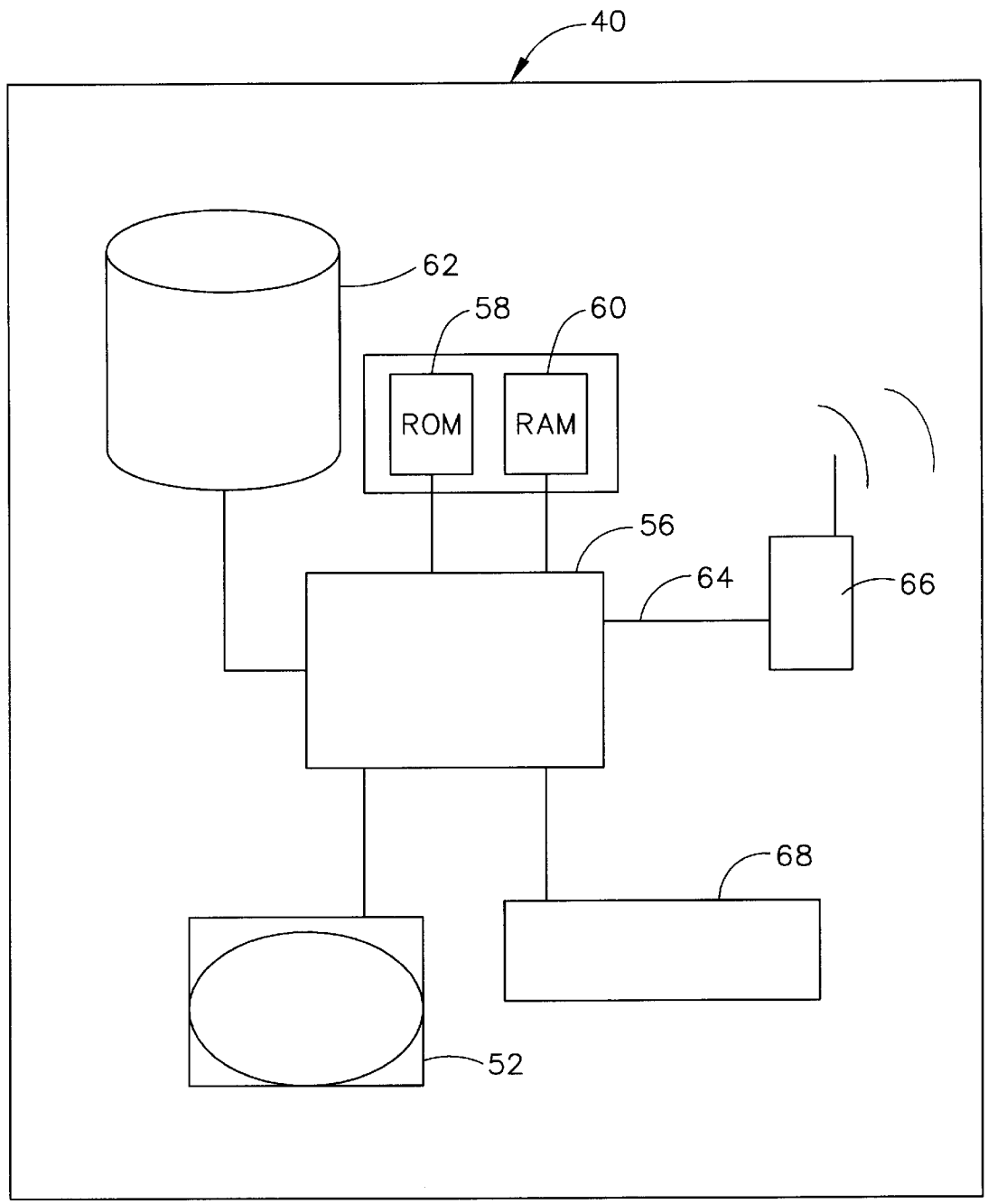
FIG. 4 is a block diagram of the major components of the portable intelligent communications device depicted in FIG. 3.

Turning to FIG. 4, the internal circuitry of portable intelligent communications device 40 includes a processing circuit 56, which may, for example, be a Motorola microprocessor known by the designation Power PC 821. It will be seen that processing circuit 56 is connected to both Read Only Memory (OM) 58 and Random Access Memory (RAM) 60, which store both operating systems and software applications. An optional bulk storage device 62 is further provided for storing databases. Processing circuit 56 is also coupled to display screen 52 through a standard driver (not shown) in order to control the images displayed thereon, as well as receive information through graphical user interfaces in which the user of portable intelligent communications device 40 may indicate chosen options. The communications functions of portable intelligent communications device 40 are also handled through processing circuit 56 via a serial and/or parallel port 64 to the particular circuitry of a communications mode designated generically by reference numeral 66. As noted hereinabove, there are several communication mode options available, including cellular, landline, IrDA, and phone cards, and it will be appreciated that more than one such option may be utilized at a given time. A keyboard 68 may also be connected to processing circuit 56, where keyboard 68 can be depicted on display screen 52 or be a separate physical package which can be utilized with portable intelligent communications device 40 such as through a keyboard IR port 70 (see FIG. 3).

Figure 5:
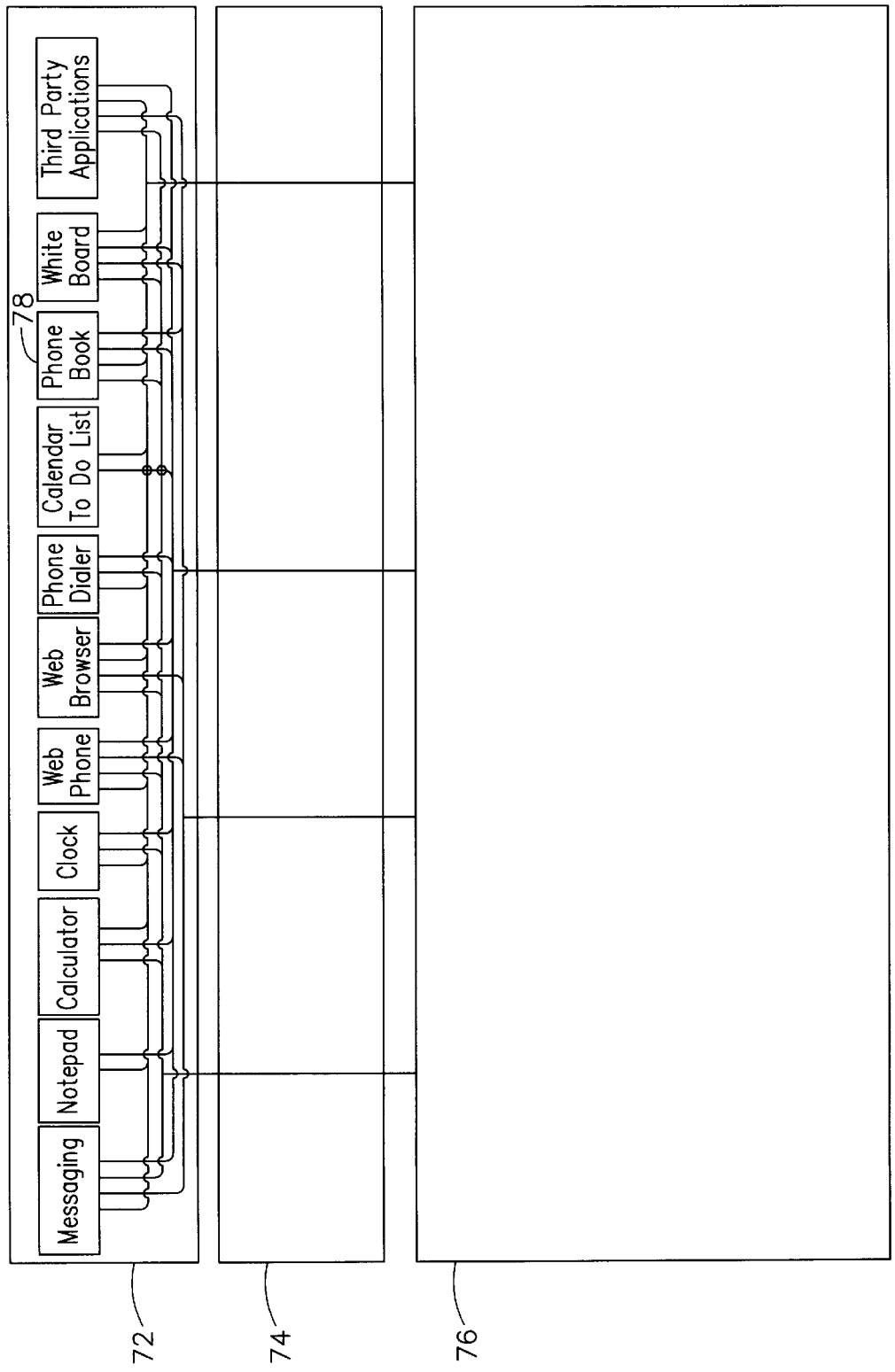
FIG. 5 is a block diagram of the software architecture for the portable intelligent communications device depicted in FIGS. 3 and 4.

FIG. 5 depicts a schematic block diagram of the software architecture for portable intelligent communications device 40. As seen therein, the software is divided into three basic areas: applications software 72, desktop software 74, and system operating software 76 (which includes everything else from the class libraries down to the device drivers for portable intelligent communications device 40). It will be understood that neither applications software 72 nor desktop software 74 will ever interact with anything other than the top layer of system operating software 76. Exemplary software applications are shown within applications software 72, with particular reference being made to phonebook software application 78.

Figure 1:
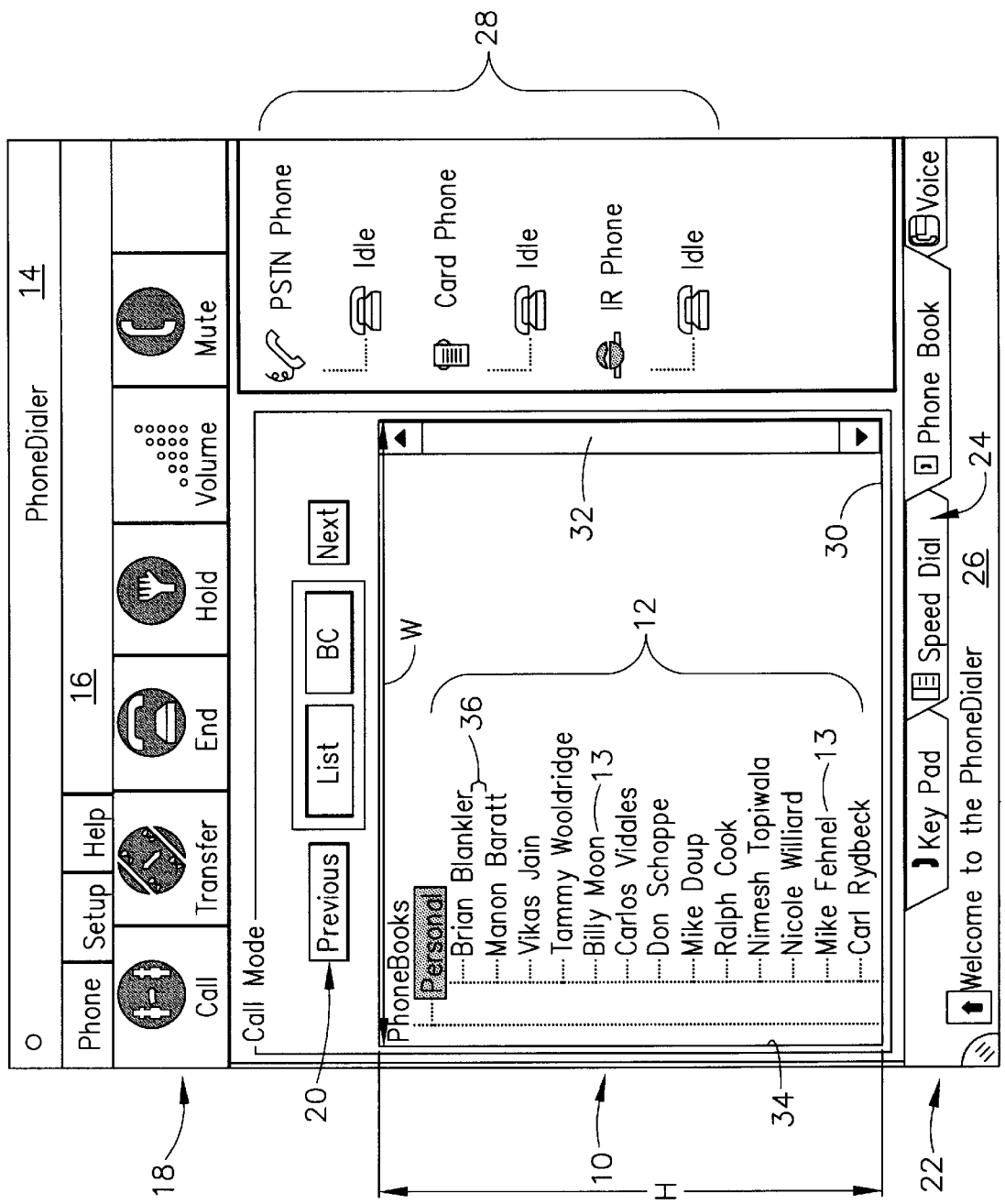
FIG. 1 is an exemplary screen display of a representative prior art display list as presented in a mouse-based system.
Figure 2:
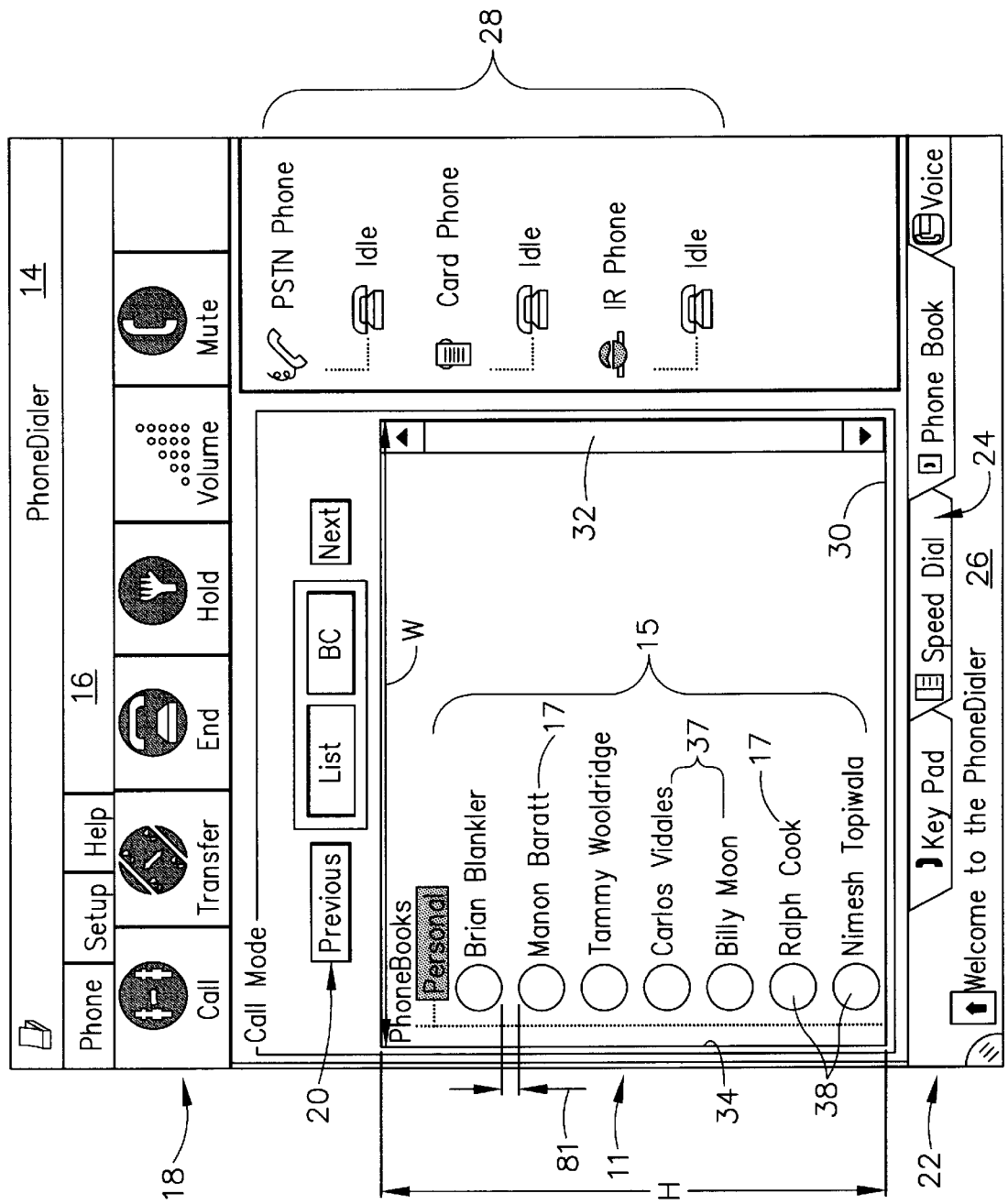
FIG. 2 is an exemplary screen display of the representative display list of FIG. 1 as presented in a prior art touch-based system.
Figure 6:
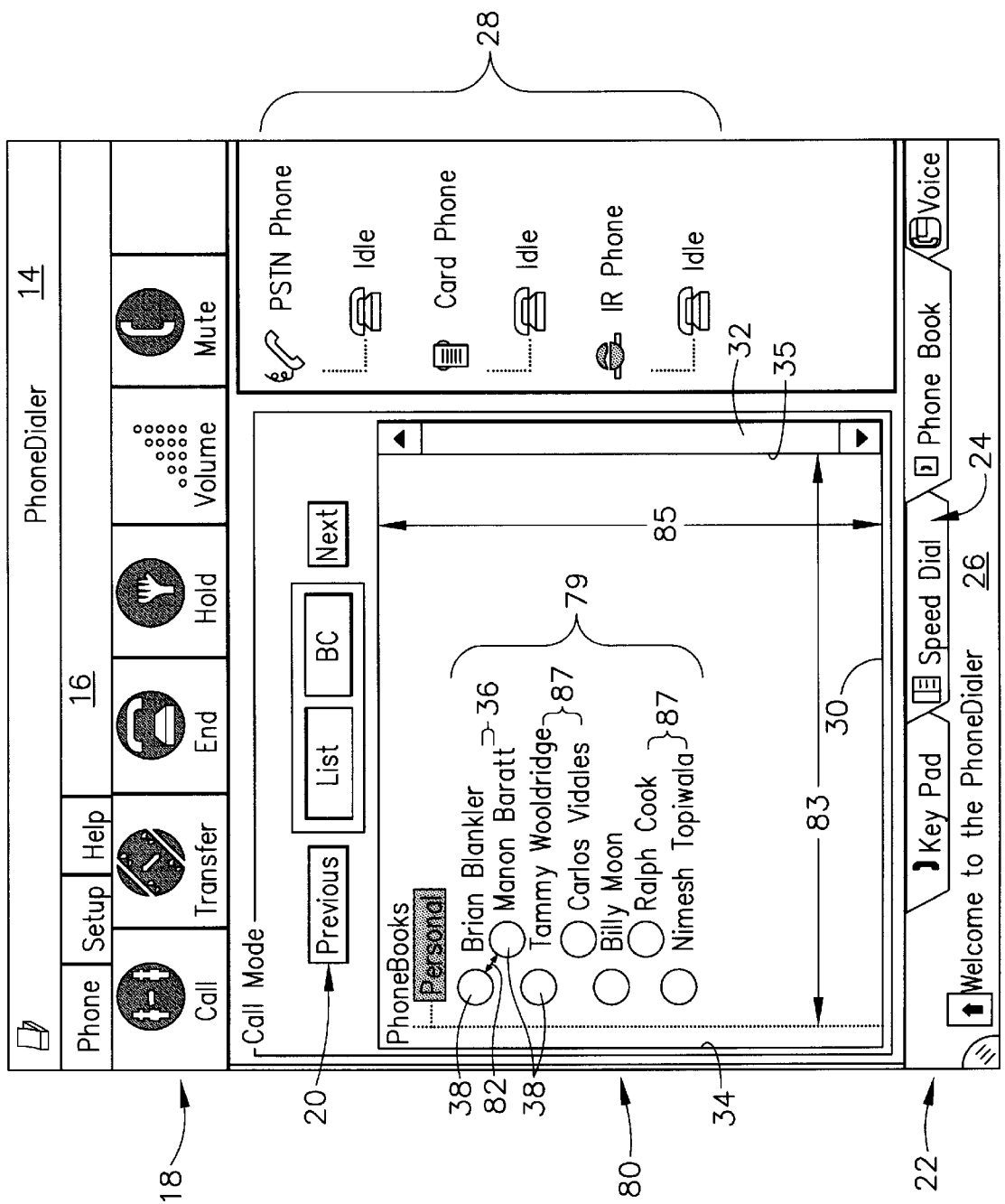
FIG. 6 is an exemplary screen display of the representative display list of FIGS. 1 and 2, presented in accordance with the principles of the present invention.

FIG. 6 depicts an exemplary screen display 80, similar to that described with respect to FIGS. 1 and 2, on which a list 79 from phonebook software application 78 is formatted to maximize use of list window space on a touchscreen in accordance with the present invention. The panels and control buttons in FIG. 6 are the same as those previously described with respect to FIGS. 1 and 2, and therefore are identified by the same reference numerals. Further, while the present invention is described with respect to display list 79 from phonebook software application 78, it is to be understood that the present invention is applicable to any type of list displayed on any type of computer-controlled touchscreen without departing from the scope of the invention.

Contrary to the prior list formats depicted in FIGS. 1 and 2, the real estate defining list window 30 in FIG. 6 is maximized by offsetting or spacing each list member 87 from adjacent list members in both a horizontal direction 83 and a vertical direction 85. By horizontally offsetting or indenting list members 87, the absolute distance between such list members 87 can be increased without increasing the vertical distance required to display list 79 beyond that utilized in a mouse-based system. The savings in vertical display area is apparent by comparing FIG. 2, in which list members 17 are spaced in only a vertical direction (identified by reference numeral 81), with FIG. 6, in which the spacing between list members 87 is on a diagonal (identified by reference numeral 82). By comparing the two Figs, it will be seen that diagonally spacing list members 87 significantly reduces the vertical space required to display list 79. Further, indenting selected members of list 79 does not decrease the visibility of list 79 because only a portion of width W of list window 30 is typically utilized when a list is displayed. Preferably, list members 87 are indented in a repeating pattern, such as those depicted in FIGS. 6, 8 and 9.

Figure 7:
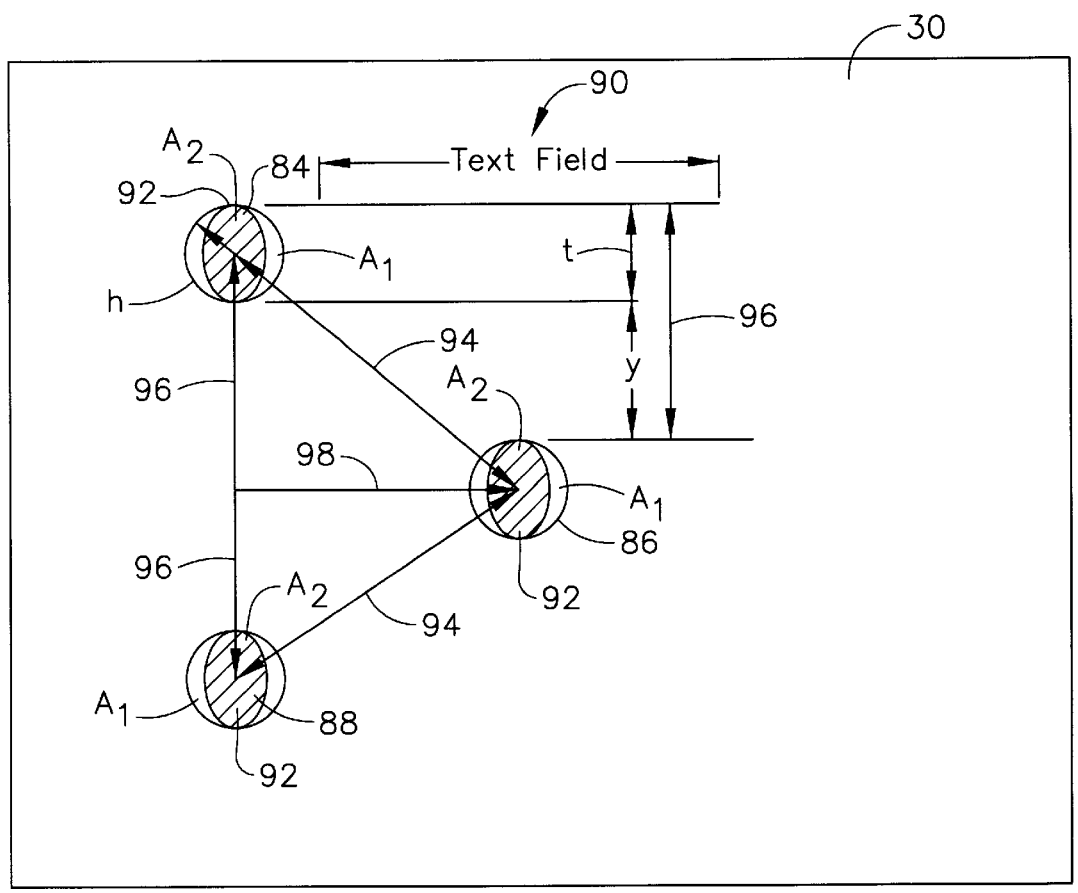
FIG. 7 is an enlarged, partial diagrammatic view of the spacing between the touchable elements of adjacent list members as seen in FIG. 6.

FIG. 7 is an enlarged, diagrammatic partial view of FIG. 6 to better show the spacing between list members 87 in accordance with the present invention. The present invention will be described with respect to a set of three icons or touchable elements, which are identified by reference numerals 84, 86 and 88, respectively, in FIG. 7. It will be understood that each touchable element 84, 86 and 88 acts as a graphical user interface, is associated with a particular list member of display list 79, and has one or more lines of text associated therewith to describe the respective list member or the function which would be performed upon activation thereof. The one or more lines of text associated with each touchable element are positioned within a text field, indicated by reference numeral 90 in FIG. 7. While the invention is to be described with respect to three touchable elements, it will be understood that the present invention is applicable to any type of display list having any number of lines of text and touchable elements without departing from the scope of the invention.

Touchable elements 84, 86 and 88 preferably have the same size and shape and, as seen in FIG. 7, are depicted as circles having a diameter "h" and a corresponding area $A_1$. It will be understood that area $A_1$ of touchable elements 84, 86 and 88 may be set for a given application, with the size of the associated list text being based on the set element area. Alternatively, the text size associated with each list member may be set (i.e., via font size), with the vertical component of touchable element area $A_1$ then being determined therefrom. In either case, height t of the display list text is preferably less than or equal to the vertical component (in this case diameter h) of the touchable elements. Within each touchable element 84, 86 and 88 is preferably a target area $A_2$ (shown as being cross-hatched) that is less than or equal to the area $A_1$ of such virtual, touchable element. This target area $A_2$ is preferably centered within the respective touchable element and is defined as the area that a finger must contact in order to "select" the touchable element or cause its function to be activated. In FIG. 7, these target areas are represented within the touchable elements by the reference numeral 92. While touchable elements 84, 86 and 88 are depicted as circles having an area $A_1$, it is to be understood that such touchable elements are preferably any convex shape (defined as a region in which a line connecting any two points in the region is entirely enclosed therein—e.g., a circle, oval, rectangle, etc.), provided that the area of the touchable element is sufficient to enable it to be touched with sufficient accuracy by a finger. It has been found that for a touchscreen situation, the preferred minimum touchable element area $A_1$ for sufficient accuracy is approximately fifty square millimeters.

For a touchscreen, there is typically a minimum required physical distance that must be maintained between target areas in the touchable elements in order for the graphical user interface to differentiate the selection of one touchable element from that of immediately adjacent touchable elements. This minimnum required distance is referred to herein as the element-space or "e", and is indicated in FIG. 7 by reference numeral 94. Element-space 94 can be measured either from edge-to-edge of touchable elements 84, 86 and 88 or between the centers of adjacent elements (as shown in FIG. 7) so long as the same reference scheme is used throughout. It will also be recognized that the measurement may be from the edge or center of the target area 92 within each respective touchable element. The value of element-space 94 can vary depending upon the software application that generates the display list, but is preferably within a range of 10–16 millimeters.

In addition to being separated by at least element-space 94, each of touchable elements 84, 86 and 88 (as well as associated text in display list 79) also occupies a vertical distance within list window 30 referred to as the line-space "l". This dimension is indicated in FIG. 7 by reference numeral 96. Line-space 96 is the sum of two separate parameters, i.e., height t of the text associated with the touchable element and the interline spacing (indicated as "y" in FIG. 7) between touchable elements. The value of line-space 96 may be set within a particular software application, depending upon the desired interline spacing y, the vertical component of the touchable elements, and the font size of the associated text for each list member. Although there presently is not a standard value for line-space 96, the preferred value therefor is in the range of 3.88–4.76 millimeters for a font size in the 10–12 pt. range. As an alternative to setting the value of line-space 96 in an application, this parameter may be calculated from element-space 94 and horizontal spacing or indentation between touchable elements, as will be described in more detail below.

In addition to element-space 94 and line-space 96, a third parameter for formatting display list 79 is the horizontal spacing or indentation ("i") between touchable elements, indicated by reference numeral 98 in FIG. 7. Indentation 98 may be a set parameter for the application or determined by processing circuit 56 from the values of element-space 94 and line-space 96. It will be understood from FIG. 7 that processing circuit 56 determines an indentation 98 which maximizes the spacing of list members 87 in display list 79 by applying the Pythagorean theorem when element-space 94 and line-space 96 are set in a given application. Accordingly, the value of indentation 98 is equal to the square root of the difference between the square of element-space 94 and the square of line-space 96 (i.e., $\sqrt{e^2-l^2}$).

Once indentation 98 is calculated, display list 79 may be formatted by positioning a first touchable element 84 and its associated text within a first line-space and at an initial horizontal location, preferably within the upper left-most area of list window 30 available (beneath any directory or group heading and/or subheading). After first touchable element 84 and its associated text is positioned within list window 30, each subsequent touchable element and its associated text is spaced from the preceding touchable element horizontally by the distance of indentation 98 and vertically by line-space 96. Each of the subsequent touchable elements is preferably offset horizontally from an immediately preceding touchable element until a maximum level of horizontal spacing or offset is reached (see FIGS. 8 and 9). This maximum level of horizontal spacing can be calculated from the left side 34 of list window 30 or the horizontal location of first touchable element 84, and is dependent upon one or more of the width W of list window 30, a required width for text field 90 (with the maximum spacing being selected so that text field 90 is not cut off by right side 35 of list window 30), the optimal level of indentation (as calculated from element-space 94 and line-space 96), and the maximum number of indentations acceptable to the user.

Figure 8:
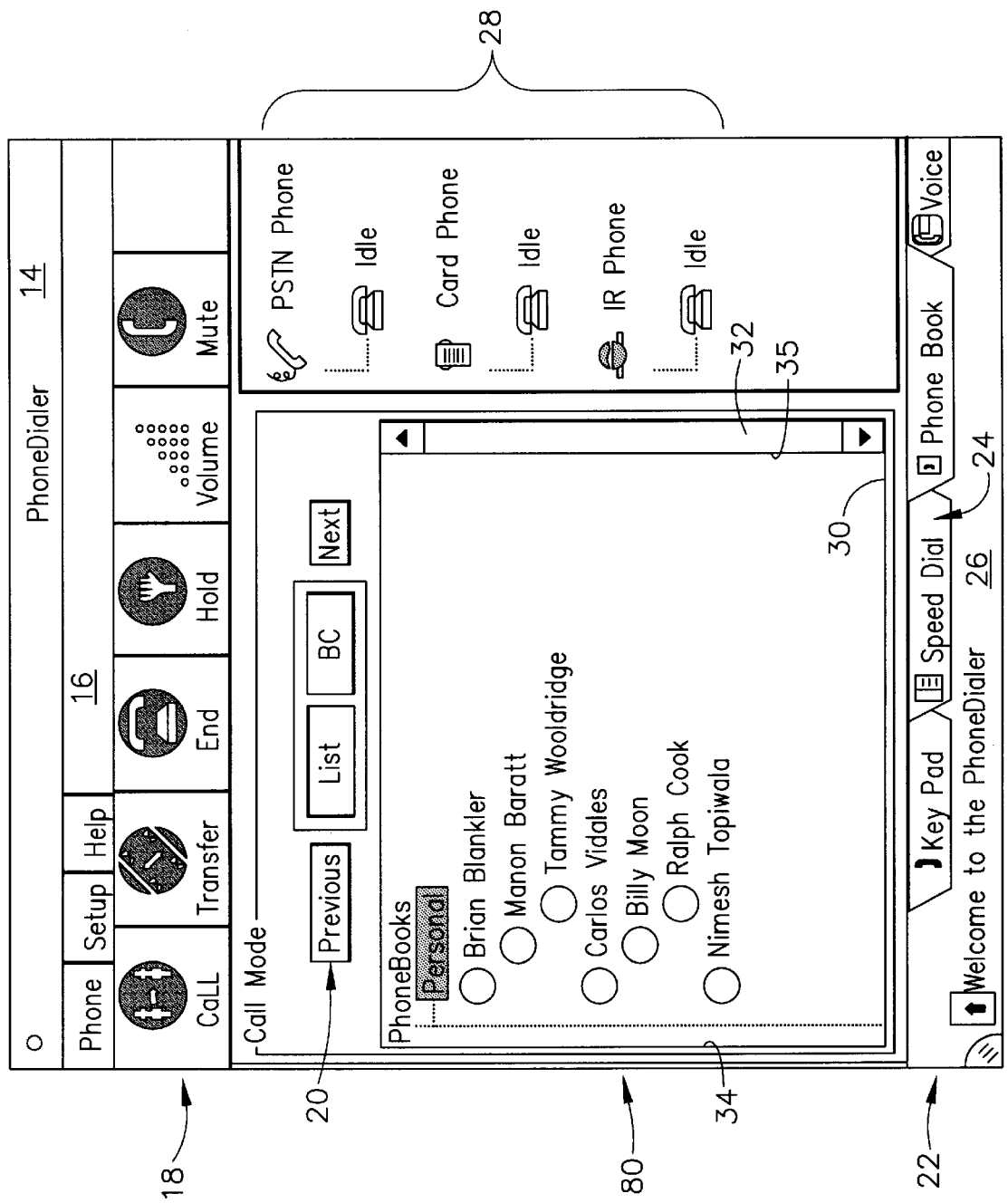
FIG. 8 is an exemplary screen display depicting a first alternative format for the representative display list of FIG. 6.
Figure 9:
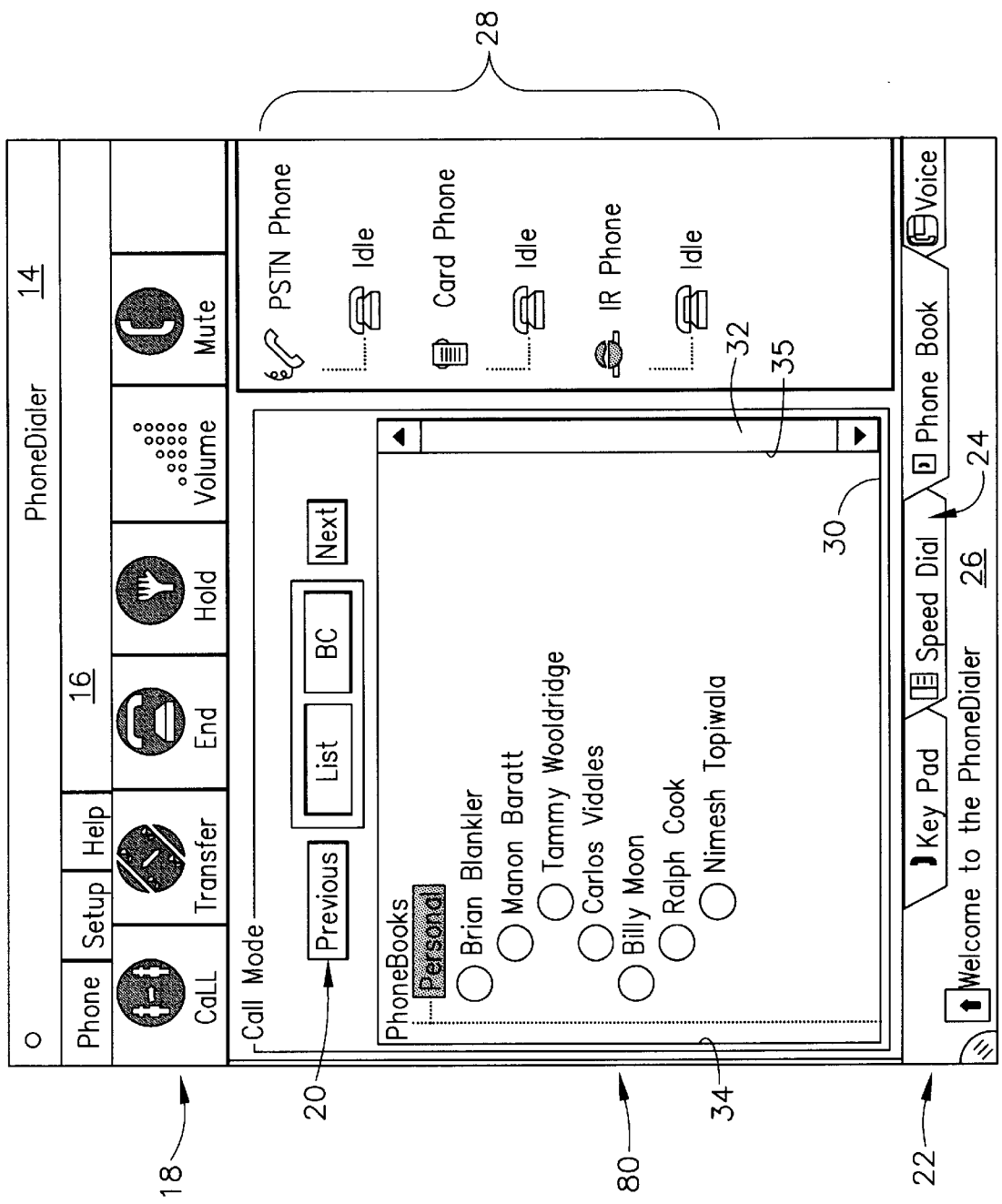
FIG. 9 is an exemplary screen display depicting a second alternative format for the representative display list of FIG. 6.

Once the maximum indentation or offset level is reached, horizontal spacing 98 may be set to zero so that the next touchable element in the list is positioned at the horizontal position of first touchable element 84 in list window 30. This format is depicted in FIG. 8, where display list 79 is indented to a maximum of two levels. Alternatively, horizontal spacing 98 for the next touchable element may be shifted in the opposite direction and preferably reduced by the value of indentation spacing 98 so that the next touchable element is spaced to the left of the previous touchable element by indentation spacing 98. This repeating pattern therefore has a zigzag format, as depicted in FIG. 9 where display list 79 is also indented to a maximum of two levels.

As mentioned above, indentation spacing 98 between adjacent touchable elements may be provided as a fixed parameter for a particular software application that generates display list 79 or it may be designated as a user input. When indentation spacing 98 is provided as a fixed parameter or input, processing circuit 56 determines the vertical spacing or line-space 96 for display list 79 from element-space 94 and indentation spacing 98.

Again applying the Pythagorean theorem, line-space 96 in this instance would be equal to the square root of the difference between the square of element-space 94 and the square of indentation spacing 98 (i.e., $\sqrt{e^2-i^2}$). Once line-space 96 is calculated, display list 79 may be formatted within list window 30 by once again placing a first touchable element 84 in a first lines-pace and at a designated horizontal position within list window 30, and thereafter vertically and horizontally spacing each subsequent touchable element and its associated text in the desired pattern (up to the maximum pattern or offset level in the manner described above).

Figure 10A:
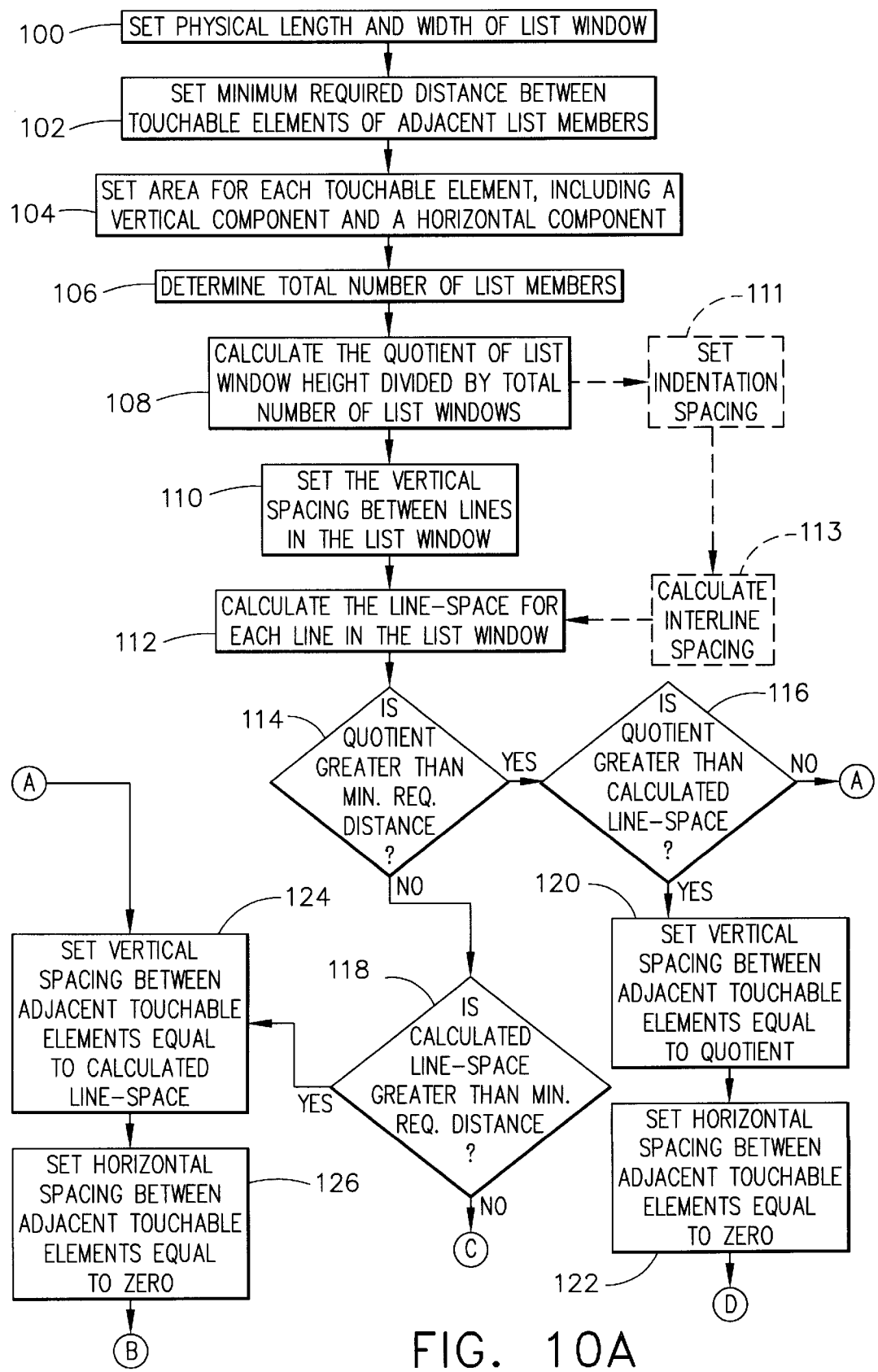
FIGS. 10A and 10B are a flow chart of the steps by which the method of the present invention is accomplished.
Figure 10B:
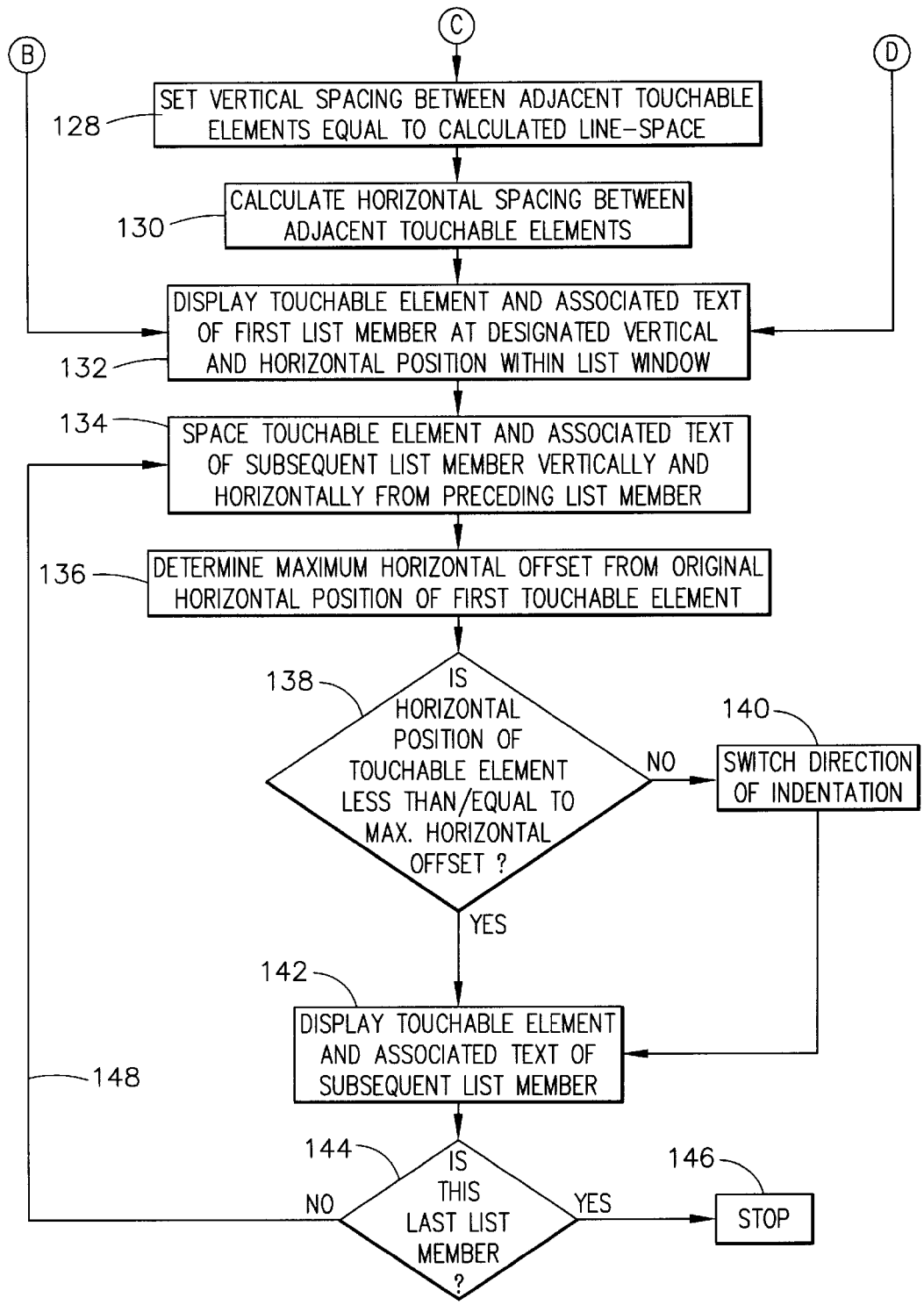

A flow chart depicting the overall process performed by processing circuit 56 in the present invention is depicted in FIGS. 10A and 10B. The method of the invention is described with reference to this flowchart for the situation in which element-space 94 and line-space 96 are fixed parameters, but may be modified in the case where element-space 94 and indentation space 98 are the fixed parameters as discussed hereinafter.

It will be seen that certain parameters are set initially, i.e., the physical height and width of list window 30 (box 100), the minimum required distance between touchable elements, or element-space 94, of adjacent list members 87 (box 102), and the area $A_1$ of each touchable element, including the vertical and horizontal components thereof (box 104).

Accordingly, the total number of list members 87 for display list 79 is determined (106) so that a quotient for the list window height and the total number of list members 87 is calculated (box 108). The vertical spacing between lines in list window 30, or the interline spacing, is then set (box 110), with the line-space 96 then being calculated therefrom (box 112). It will be recalled that line-space 96 is preferably the sum of the text height t (corresponding to the font size thereof) and the interline spacing y (see FIG. 7), although it may alternatively be equivalent to the sum of the vertical component of the touchable element area and the interline spacing.

Nevertheless, processing circuit 56 then determines which of element-space 94, line-space 96 and the quotient calculated in box 108 is greatest. This is seen in the flow chart from decision boxes 114, 116 and 118. More specifically, decision box 114 determines whether the quotient from box 108 is greater than the minimum required distance (i.e., element-space 94). If the answer is positive, then decision box 116 next determines whether the quotient is greater than the calculated line-space 96. In the instance where such quotient is the greatest, the vertical spacing between adjacent touchable elements is set to the quotient (box 120) and the horizontal spacing between adjacent touchable elements is set to zero (box 122). It will be seen that if the quotient is not greater than calculated line-space 96, the vertical spacing between adjacent touchable elements is set to such calculated line-space (box 124) and the horizontal spacing between adjacent touchable elements is set to zero (box 126). Decision box 118 determines whether the calculated line-space 96 is greater than the minimum required distance (element-space 94) in the instance when the quotient from box 108 is not greater than such element-space 94 (i.e., a negative answer to decision box 114). If the answer to decision box 118 is positive, then the vertical spacing and horizontal spacing of adjacent touchable elements is set in accordance with the previously described boxes 124 and 126. Thus, it will be understood that no horizontal spacing between adjacent touchable elements is required when element-space 94 is not greater than both the quotient from box 108 and line-space 96.

When element-space 94 is greater than both the quotient of box 108 and the calculated line-space 96, then the vertical spacing between adjacent touchable elements is set to the calculated line-space 96 (box 128) and the horizontal spacing between adjacent touchable elements is calculated (box 130). It will be recalled that such horizontal spacing, also known herein as the indentation 98, is the square root of the difference between the element-space 94 squared and the line-space 96 squared.

It will be seen that processing circuit 56 next displays the touchable element (and the associated text immediate thereto) of a first list member at a designated vertical and horizontal position within list window 30 (box 132). This typically will be adjacent an upper left hand corner of list window 30, as depicted in FIG. 6. In accordance with the vertical and horizontal spacing set or calculated from the steps described above, the touchable element (and associated text) of the subsequent list member is then spaced from the touchable element of the preceding list member (box 134).

In order to prevent the touchable element and associated text of a list member 87 from extending past the physical width W of list window 30, a maximum horizontal offset from the original horizontal position of the first touchable element preferably is determined (box 136). This may be accomplished by dividing the difference of the list window width W and the required text width 90 associated with each list member by the indentation distance 98 calculated in box 130 above, dividing a preset maximum indentation depth by indentation distance 98, or dividing the element-space 94 by the vertical spacing between adjacent touchable elements. Alternatively, a horizontal scroll (not shown) may be provided within list window 30 so that the user of touchscreen 52 can shift display list 79. It will be noted that this is relevant only in the case where element-space 94 is greater than the quotient from box 108 and the calculated line-space 96.

As seen from decision box 138, processing circuit 56 determines whether the horizontal position of the touchable element for the subsequent list member as spaced is less than or equal to the maximum horizontal offset determined in box 136. If the determination is negative, the touchable element must be shifted horizontally in the opposite direction of the normal indentation spacing 98 (box 140). It will be understood that the touchable element can be moved back to the original horizontal position of the first touchable element and proceed as before therefrom (see FIG. 8) or incrementally through the previous indentation levels until the original horizontal position is attained in zigzag fashion (see FIG. 9), provided the horizontal spacing maintains the minimum required spacing between touchable elements. Once an acceptable horizontal position of the touchable element is found, the touchable element and the text associated therewith for the list member is displayed within list window 30 (box 142).

Finally, processing circuit 56 determines whether the list member is the last one of display list 79 (decision box 144). If so, the process is completed (box 146). Otherwise, a feedback loop 148 returns to box 134 so that the next subsequent list member may be spaced and displayed.

It will be understood that instead of setting the vertical spacing between lines in list window 30 (box 110), the method of the present invention may set the horizontal spacing or indentation 98 (dashed box 111). In this way, the interline spacing may be calculated (dashed box 113) as a function of element-space 94 and indentation 98 (i.e., the square root of the difference of element-space 94 squared and indentation 98 squared). Then, the line-space 96 may be calculated as described hereinabove in box 112. Of course, there is no need to calculate the horizontal spacing as before in box 130.

From the foregoing, it will be seen that the present invention more efficiently utilizes list window real estate on a touchscreen by reducing the vertical spacing between adjacent list members in the situation where the vertical spacing or line-space 96 is less than the minimum required distance 94 between touchable elements for maintaining selection consistency. This space savings is evident by comparing the amount of unused space for a traditional touchscreen display list presentation, in which the list members are aligned along left edge 34 of list window 30, with the present invention. In the traditional presentation, the amount of unused space is equal to the difference between element-space 94 and line-space 96, multiplied by the physical width of list window 30, or $((e-1) \times W)$. By contrast, the amount of unused space according to the present invention is equal to the product of the maximum number of indentation levels I, indentation spacing 98 and line-space 96, or $(I \times i \times l)$.

Figure 11:
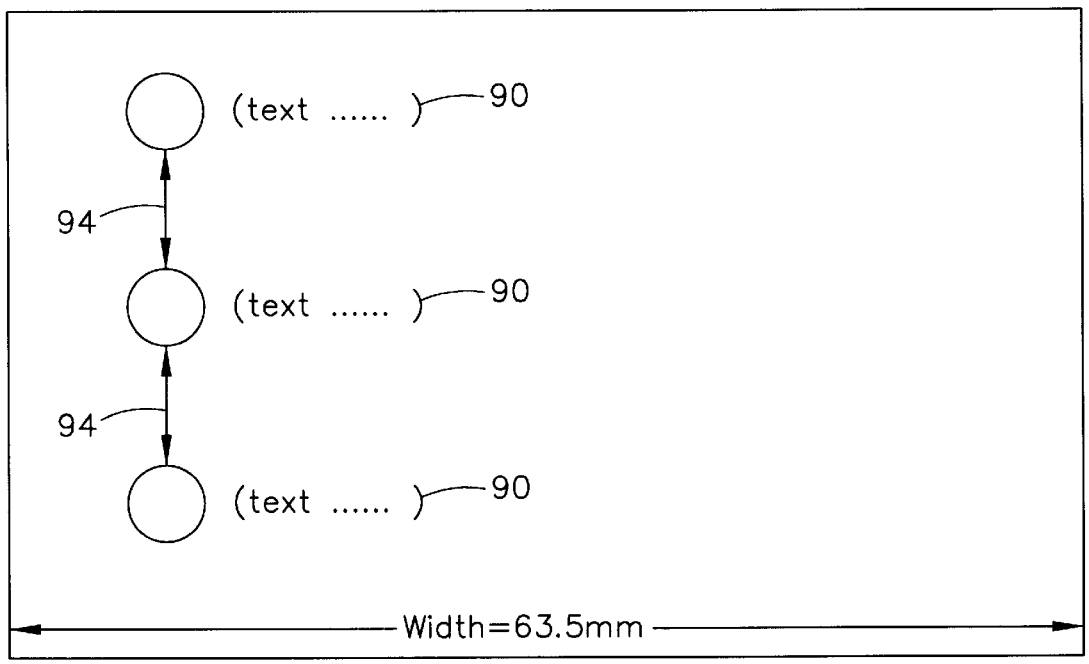
FIG. 11 is an exemplary, diagrammatic view of the spacing between touchable elements of adjacent list members for the representative display list of FIG. 2.
Figure 12:
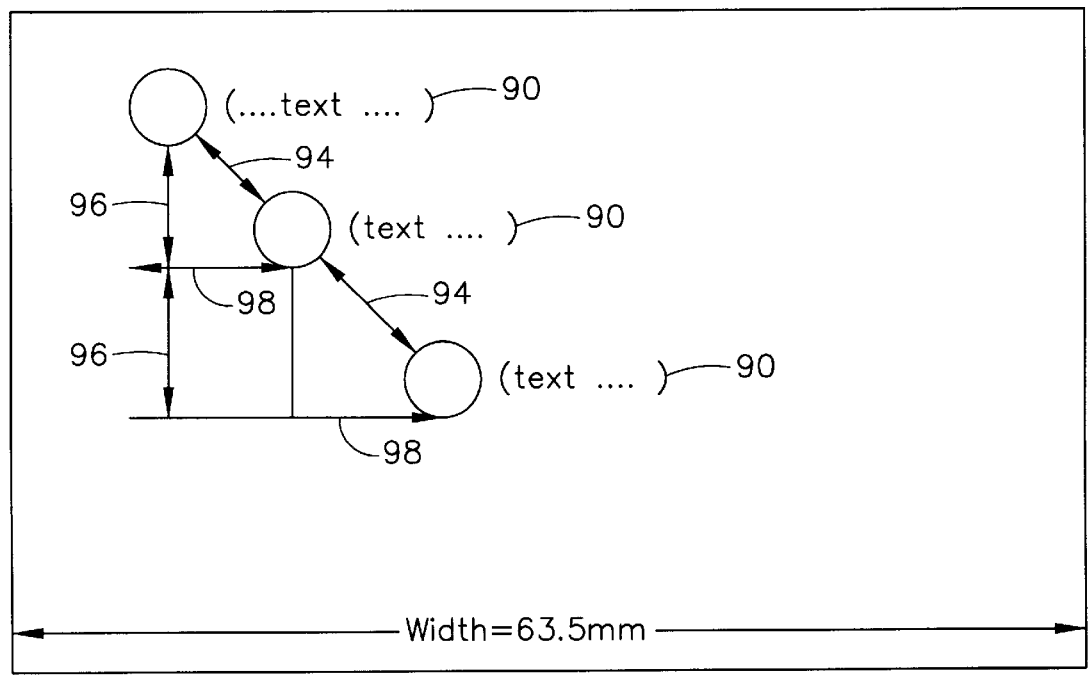
FIG. 12 is an exemplary, diagrammatic view of the spacing between touchable elements of adjacent list members for the representative list of FIG. 8.

The following example, depicted in FIGS. 11 and 12, illustrates this space savings where element-space 94 is equal to 12 millimeters, line-space 96 is equal to 4 millimeters, and the width W of list window 30 is 63.5 millimeters. Further, display list 79 is indented to a maximum of two levels. Following the process described above, indentation $i=\sqrt{e^2-l^2}$ or 11.3 millimeters. Therefore, the amount of unused space under the previous method is (12 millimeters−4 millimeters)×63.5 millimeters=508 square millimeters. By comparison, the amount of unused space in list window 30 under the present inventive method is 3×11.3 millimeters×4 millimeters=135.6 square millimeters. Thus, the present invention results in a space savings of over 70% from the traditional method since less vertical space is required between list members. This will permit more list members 87 of display list 79 to be displayed on touchscreen 52 for the same amount of real estate for list window 30, thereby increasing user satisfaction.

Having shown and described the preferred embodiment of the present invention, further adaptations of the apparatus and method for displaying a list on a touchscreen can be accomplished by appropriate modifications by one of ordinary skill in the art without departing from the scope of the invention.

What is claimed is:

1. A method of formatting a list for display within a designated list window of a touchscreen, said list including a plurality of list members with a touchable element and text associated therewith, said method comprising the following steps:

(a) setting a minimum required distance between touchable elements of adjacent list members;

(b) setting an area for each touchable element of said list members, wherein said area has a vertical component and a horizontal component;

(c) setting a required interline spacing between touchable elements of adjacent list members;

(d) calculating a line-space for each list member as a function of said vertical component of said touchable element area and said interline spacing;

(e) positioning a first list member at a designated line-space within said list window; and (f) spacing each subsequent list member vertically and horizontally a specified amount from an immediately preceding list member in said list so that at least said minimum required distance between touchable elements is maintained.

2. The method of claim 1, wherein said designated line-space is located at an upper left corner of said list window.

3. The method of claim 1, wherein the vertical component of said touchable element area is a function of font size for the associated text of each list member.

4. The method of claim 1, wherein font size for the associated text of each list member is a function of the vertical component set for said touchable element area.

5. The method of claim 1, wherein horizontal spacing between the touchable elements of adjacent list members is determined as a function of said space for each said list member and said minimum required distance between the touchable elements for said adjacent list members.

6. The method of claim 5, wherein said horizontal spacing between the touchable elements of adjacent list members is equal to the square root of the difference between the square of said minimum required distance between the touchable elements for said adjacent list members and the square of said line-space for each said list member.

7. The method of claim 1, wherein the touchable element of each list member subsequent to said first list member is spaced horizontally either left or right of the touchable element for said immediately preceding list member.

8. The method of claim 1, wherein the touchable elements of said list members are horizontally spaced by an indentation level having a specified distance.

9. The method of claim 8, wherein a specified number of indentation levels for the touchable element of said list members is available.

10. The method of claim 9, wherein said specified number of indentation levels is user selectable.

11. The method of claim 9, wherein said specified number of indentation levels is determined as a function of said minimum required distance between the touchable elements of said adjacent list members and said line-space for each said list member.

12. The method of claim 9, wherein said specified number of indentation levels is determined as a function of a physical width for said list window on said touchscreen and a required field width for viewing the associated text of each said list member.

13. The method of claim 8, wherein the touchable elements of said list members are spaced in a repeating pattern.

14. The method of claim 13, wherein said repeating pattern involves alternating the touchable elements of said list members between a designated starting horizontal position within said list window and at least one indentation level.

15. The method of claim 1, wherein said spacing between adjacent touchable elements is a maximum of said calculated line-space, said minimum required distance, or a quotient of a physical height for said list window and a total number of list members.

16. The method of claim 15, wherein said horizontal spacing between the touchable element of each subsequent list member and the touchable element of said immediately preceding list member is equal to zero when said calculated line-space for each said list member is greater than said minimum required distance between touchable elements for adjacent list members.

17. The method of claim 15, wherein said horizontal spacing between the touchable element of each subsequent list member and the touchable element of said immediately preceding list member is equal to zero when said quotient of the physical height of said list window and said total number of list members is greater than said minimum required distance between touchable elements of adjacent list members.

18. The method of claim 1, wherein said minimum required distance between touchable elements of adjacent list members is in a range of 10–16 millimeters.

19. The method of claim 1, wherein said calculated line-space for each list member is in a range of 3.88–4.76 millimeters.

20. A method of formatting a list for display within a designated list window of a touchscreen, said list including a plurality of list members with a touchable element and text associated therewith, said method comprising the steps of:

(a) setting a minimum required distance between touchable elements of adjacent list members;

(b) setting an area for each touchable element of said list members, wherein said area has a vertical component and a horizontal component;

(c) setting an indentation distance between touchable elements of adjacent list members;

(d) positioning a first list member at a designated line space within said list window;

(e) horizontally spacing each subsequent list member from an immediately preceding list member in said list by at least said indentation distance; and (f) vertically spacing each subsequent list member from an immediately preceding list member by an amount calculated as a function of said indentation distance and said minimum required distance between touchable elements of adjacent list members.

21. The method of claim 20, wherein said designated line-space is located at an upper left corner of said list window.

22. The method of claim 20, wherein the vertical component of said touchable element area is a function of font size for the associated text of each list member.

23. The method of claim 20, wherein font size for the associated text of each list member is a function of the vertical component set for said touchable element area.

24. The method of claim 20, wherein vertical spacing between the touchable elements of adjacent list members is determined as a function of said indentation distance and said minimum required distance between the touchable elements for said adjacent list members.

25. The method of claim 24, wherein said vertical spacing between the touchable element of each subsequent list member and the touchable element of an immediately preceding list member is equal to the square root of the difference between the square of said minimum required distance between touchable elements of adjacent list members and the square of said indentation distance.

26. The method of claim 20, wherein said vertical spacing between the touchable element of each subsequent list member and the touchable element of an immediately preceding list member is equivalent to a line-space for each list member and an interline spacing between list members.

27. The method of claim 20, wherein the touchable element of each list member subsequent to said first list member is spaced horizontally either left or right of the touchable element for said immediately preceding list member.

28. The method of claim 20, wherein the touchable element of said list members alternate horizontally between a left edge of said list window and said indentation distance.

29. The method of claim 20, wherein a specified number of indentation levels for the touchable element of said list members is provided.

30. The method of claim 29, wherein said specified number of indentation levels is user selectable.

31. The method of claim 29, wherein said specified number of indentation levels is determined as a function of said minimum required distance between touchable elements of adjacent list members and said vertical spacing between list members.

32. The method of claim 29, wherein said specified number of indentation levels is determined as a function of the difference between a physical width of said list window, a required field width for viewing the associated text of each said list member, and said indentation distance.

33. The method of claim 20, wherein the touchable elements of said list members are spaced in a repeating pattern.

34. The method of claim 33, wherein said repeating pattern involves alternating said touchable elements between a designated starting horizontal position within said list window and at least one indentation level.

35. The method of claim 20, wherein said spacing between adjacent touchable elements is a maximum of said minimum required distance between touchable elements of adjacent list members and a quotient of a physical height for said list window and a total number of list members.

36. The method of claim 35, wherein said horizontal spacing between the touchable element of each subsequent list member and the touchable element of said immediately preceding list member is equal to zero when said quotient of the physical height of said list window and said total number of list members is greater than said minimum required distance between touchable elements of adjacent list members.

37. The method of claim 20, wherein said minimum required distance between touchable elements of adjacent list members is in a range of 10–16 millimeters.

38. The method of claim 20, wherein said indentation distance is in a range of 8–16 millimeters.

39. In a computer system having a memory circuit, a processing circuit, and a touchscreen, a method of formatting a display list for finger-based selection comprising the step of displaying, under the control of said processing circuit, a plurality of touchable elements and associated text within a list window on said touchscreen, each of said touchable elements being spaced from immediately adjacent touchable elements a minimum specified distance to permit selection of any one of said touchable elements without any other of said immediately adjacent touchable elements being simultaneously selected, said minimum specified distance having a horizontal component and a vertical component in relation to said list window.

40. The method of claim 39, wherein each of said plurality of touchable elements is vertically spaced from said immediately adjacent touchable elements by an interline spacing.

41. The method of claim 40, wherein each of said plurality of touchable elements is horizontally spaced by an indentation level having a specified distance which is a function of said interline spacing and said minimum specified distance.

42. The method of claim 41, wherein a maximum number of indentation levels for the touchable elements of said list members is available.

43. The method of claim 42, wherein said maximum number of indentation levels is user selectable.

44. The method of claim 42, wherein said maximum number of indentation levels is a function of said minimum specified distance and said interline spacing.

45. The method of claim 42, wherein said maximum number of indentation levels is a function of said horizontal spacing between adjacent touchable elements, a physical width of said list window and a required field width for said text associated with said touchable element.

46. A portable intelligent communications device, comprising:
 (a) circuitry for performing telephony operations;
 (b) a memory circuit including at least one display list and at least one software application for accessing said list;
 (c) a processing circuit associating a touchable element and related text with each list member in said display list; and
 (d) a touchscreen coupled to said processing circuit for displaying lists from said memory circuit;

wherein the touchable elements and associated text of said list members are formatted within a list window on said touchscreen such that the touchable elements of immediately adjacent list members are a minimum specified distance apart to permit finger-based selection of one of said touchable elements without simultaneous selection of said immediately adjacent touchable elements, said minimum specified distance between immediately adjacent touchable elements having a vertical component and a horizontal component in relation to said list window.

47. The portable intelligent communications device of claim 46, wherein said processing circuit determines said horizontal component of said minimum specified distance as a function of a designated interline spacing between said list members and said minimum specified distance between the touchable elements of immediately adjacent list members.

48. The portable intelligent communications device of claim 46, wherein said processing circuit determines said vertical component of said minimum specified distance from said horizontal component and said minimum specified distance between the touchable elements of immediately adjacent list members.

49. The portable intelligent communications device of claim 46, wherein said processing circuit formats the touchable elements of said list members in a repeating pattern.

50. A method of formatting a list of touchable elements and associated text on a touchscreen of a portable intelligent communications device, wherein the number of touchable elements and associated text displayed within a list window on said touchscreen is maximized without creating selection ambiguity between adjacent touchable elements, said method comprising the following steps:
 (a) setting a minimum required distance between adjacent touchable elements;
 (b) setting an area for each of said touchable elements, wherein said area has a vertical component and a horizontal component in relation to said list window;
 (c) setting a required interline spacing between adjacent touchable elements;
 (d) calculating a line-space for each touchable element and its associated text as a function of said vertical component of said touchable element area and said interline spacing;
 (e) determining a horizontal offset spacing between adjacent touchable elements;
 (f) determining a maximum number of offset levels for a repeating pattern of said touchable elements;
 (g) positioning a first touchable element and associated text within a first line-space on said list window;
 (h) spacing each subsequent touchable element horizontally and vertically from an immediately preceding touchable element by said offset spacing in an offset pattern until said maximum offset level is reached; and
 (i) repeating said offset pattern until all touchable elements and associated text in said list are displayed.

* * * * *

UNITED STATES PATENT AND TRADEMARK OFFICE
CERTIFICATE OF CORRECTION

PATENT NO.   : 6,157,379
DATED        : December 5, 2000
INVENTOR(S)  : Mona Singh It is certified that error appears in the above-identified patent and that said Letters Patent is hereby corrected as shown below:

In column 12, line 58, claim 5, delete [space] and insert line-space.

In column 13, lines 67 and 68, claim 20, delete [line space] and insert line-space.

Signed and Sealed this

First Day of May, 2001

*Attest:*

NICHOLAS P. GODICI

*Attesting Officer*     *Acting Director of the United States Patent and Trademark Office*